2,828,210
Patented Mar. 25, 1958

United States Patent Office

2,828,210

METHOD OF INHIBITING BACTERIA, MOLD, ETC., GROWTH ON STRAWBERRIES

Herman J. Keller, Dunedin, Fla., assignor, by mesne assignments, to Brogdex Company, Orange County, Fla., a corporation of Florida No Drawing. Application October 22, 1951
Serial No. 252,581

6 Claims. (Cl. 99—154)

The present invention relates generally to the art of preserving fresh foods from the destructive action of bacteria, mold, and other organisms, and more particularly to a novel method of inhibiting the development of harmful organisms in citrus fruits and other freshly gathered perishable foods.

This application is a continuation-in-part of my co-pending application, Serial No. 4,209, filed January 24, 1948, now Patent No. 2, 577,421, granted December 4, 1951.

There has long existed the problem of profitably getting Florida citrus fruits and other freshly gathered foods into the hands of the ultimate consumer without damage or total destruction thereof by bacteria, mold, and other living organisms. Particularly destructive to citrus fruits are mold organisms and stem-end decay caused by phomopsis (black), dipplodia (white), or other organisms. These latter organisms enter the fruit at the split stem and cause a partial or complete breakdown of the fruit before it can be sold to the consumer. Iodine applied to the end of the fruit stem will prevent the entry of the destructive organisms causing stem-end decay, but this is not a practical solution in this country where labor is high, since such action must be by the individual application of a worker. Other organisms attack fruit through breaks in the skin. Hence, a large share of the problem of getting sound Florida citrus fruit into the hands of the consumer is the inhibiting or destroying of destructive organisms which prey on it. The same general problem exists in regard to citrus from other areas and other fresh perishables from Florida and elsewhere.

In brief, the present invention comprises a method of inhibiting the development of destructive organisms in citrus fruits and other fresh foods, which are desired to be delivered to the customer in the form as gathered, sufficiently long to insure consumption in a palatable and sound condition by the ultimate consumer. Prior to movement from a packing or processing plant, the citrus fruits, or other fresh perishables, are subjected to an atmosphere of organism inhibiting gas for a predetermined period of time which is later repeated where shipping and selling time exceed a predetermined number of days, a time period dependent upon the specific inhibitor and food. For citrus fruits, preferably the inhibitor is poured on the floor of the shipping car or truck, or in a container placed therein, and permitted to evaporate and envelop the fruit while the car is closed.

Therefore, an object of the present invention is to provide a novel method of inhibiting the development or growth of destructive organisms in and on citrus fruit and other fresh perishable food which overcomes the long existing problem of getting sound products to the consumer.

Another object is to provide a novel method of treating citrus fruit and other fresh foods to inhibit the growth of destructive organisms for predetermined periods which may be simultaneously and quickly applied to large numbers of the fruit or other fresh food to effectively achieve the desired inhibition.

Another object is to provide a novel method of achieving delivery of sound fresh perishables to the consumer which includes repeatedly subjecting the perishables to an atmosphere containing an organism inhibitor effective for a period of time following each subjection to prevent the development of destructive organisms.

Other objects are to provide a novel method of inhibiting the development of destructive organisms in and on citrus fruits and other fresh foods for a desired period of time which is economical, practical, readily used effectively, and finds widespread commercial adaptation.

Particularly considering the present invention's application to citrus fruit, by way of example, it is a well known fact that oranges, grapefruit, tangerines, and so forth, are shipped from Florida and other areas where grown, by rail, truck, or the like, to distant markets. Normally, it requires but three to five days to move citrus fruit from the packing house in Florida to the wholesale market in New York, but delays in transit may increase the normal time by from a few hours to a number of days, and shipments into Canada and into the western part of our country normally may consume twelve to fourteen days which will be increased by delays as mentioned.

The present invention contemplates the application of an inhibitor to citrus fruit and other fresh foods after the fruit or the like is cased or otherwise packed and stacked in the transportation medium, such as a railroad refrigeration or box car, or a truck. In the case of citrus fruit, it is well known that each orange or other fruit is cleaned and treated in a normally continuous process prior to crating and placing in a freight car or truck. In crating, staples or the like injure a substantial percentage of the fruit, and cause breaks in the fruit skin which obviously can receive no help from the borax and other organism inhibitors which have been applied during processing. Once the fruit is in the transportation unit, the doors and vents are closed, and, in the case of a refrigeration car or box car, a suitable predetermined quantity of a liquid volatile at car temperature is poured onto the actual or temporary floor of the car from the outside by means of a suitable hose or the like located at each end thereof. If desired, the liquid may be poured on the car floor before closing the door. It is to be understood, of course, that the floor of the transportation unit does not leak. The whole procedure consumes less than five minute. The liquid is permitted to evaporate and to permeate the car, thereby coming into enveloping contact with the outer surfaces of all of the fruit. Where the car is not refrigerated or iced, it is vented a predetermined time after evaporation. By way of example, an excellent inhibitor of the type desired to prevent the development to stem-end decay and other deleterious growths in citrus fruits, such as molds, is an admixture of two parts by weight of ethylene dichloride and one part by weight of trichloroethane. This admixture has been demonstrated to inhibit the growth of stem-end decay and other growths in citrus fruits without harmfully affecting the fruit or adding an off-flavored taste. Substantially two to two and a half gallons of this admixture poured onto the floor of the box car or refrigeration car in which is disposed a capacity load of packed citrus fruit will evaporate in from ten to twelve hours, and, tests have demonstrated, when the car is left closed for twenty-four hours from the time the inhibitor liquid is poured on the floor and then vented to atmosphere, will inhibit the growth of harmful organisms in the fruit, such as stem-end decay, mold, and the like, for from eight to twelve days. Manifestly, a proportionate amount of the admixture is required for a truck of lesser capacity than a box car. It is to be noted that the mentioned admixture vaporizes at less than 32° F., so that there is no difficulty on the point of vaporization at ambient temperatures in sunny Florida or other citrus growing climates, or in cold Canada. At the expiration of the twenty-four hours, the vents on the railroad car, truck, or the like, are opened, as mentioned, so that the fruit may receive air while en route. Manifestly, the vents may be opened before the car moves into the transit stage, or the vents may be opened in transit. As stated, in refrigerated or iced cars, the vents are left closed. However, refrigeration and ice are unnecessary when the present invention is practiced, so that great savings in refrigeration and ice costs are achieved.

Since, as is pointed out above, the fruit may be held in the freight car or other transportation unit for an excessive number of days due to shipping difficulties, or the normal shipping time may be greater than eight days, the present invention contemplates the "re-gassing" of the fruit in transit or at destination prior to unloading, to insure delivery of sound fruit to the wholesale merchant, to the retail merchant, and to the eventual consumer. When the above-mentioned admixture is used, at the expiration of eight days from the completion of the initial gassing, a second equal amount of the admixture is poured onto the floor of the freight car, or other transportation unit, and permitted to evaporate at ambient temperature under the same conditions as previously mentioned. The second quantity of admixture may be supplied at some point en route when the normal shipping time is known to be greater than eight days, or it may be applied at destination when the handling time following opening of the car is expected to be of such length that the over-all time between initial "gassing" and consumption is substantially in excess of eight days, or the fluid may be automatically poured onto the floor of the box car, or other transportation unit, by a suitable clock or otherwise actuated mechanism from a container mounted within the car. Obviously, where an automatic mechanism is employed for delivering the second quantity of admixture, such would be manually deenergized upon opening of the car, or the like, prior to the time for which automatic operation was scheduled.

Experimental commercial carload and truckload shipments of citrus fruits have demonstrated the effectiveness of the present novel method of applying a growth inhibitor to the fruit. Normally, citrus fruits and other perishables are shipped iced in order to maintain the fruit or the like during shipment at a temperature low enough to retard the growing activity of destructive organisms. The combination of pre-cooling and icing is also resorted to. However, ice and refrigerating equipment are expensive, and such cars often arrive at destinations with mold infested moisture dripping all over the fruit which is in large percentage affected thereby before sale to the ultimate consumer is accomplished.

In one experimental carload shipment, three carloads of Florida oranges were shipped to New York iced, three carloads were shipped pre-cooled and iced, and three carloads were shipped gassed with the admixture above-mentioned under the conditions specified and traveled the remainder of the trip following the twenty-four hour gassing period with opened vents and standard ventilation. Three separate trains were utilized in order to time space the shipments, each train including one car of each type of loading. All oranges were from the same packing house and from the same groves, each comparative group of cars having been loaded at the same time. In the test shipments, there were no serious delays and each of the three sets of cars arrived in New York in an average transit time of six days.

In each of the cars was a control or test package of fruit. In one shipment, the test package in the iced car arrived at destination with 2.2% decay, that in the pre-cooled and iced car with 3.7% decay, and that in the "gassed" car with 0.5% decay. The other test packages showed corresponding decay percentages. In addition, the fruit of the test package of the gassed car showed no additional decay at the end of nine days from the shipment date, whereas the fruit from the test packages of both the iced and the pre-cooled and iced cars showed an excess of 5% of decay at the end of the nine days from shipment date. The fruit of the three test packages was maintained at a temperature below 50° F., to approximate the temperature at which the fruit from the three cars was maintained in the wholesaling and retailing thereof.

It is a well known fact that Florida oranges shipped under normal iced conditions and handled in the normal manner of wholesaling and retailing undergo a high loss percentage before reaching the retailer, a conservative average percentage being 4%, in the Eastern, Western, and Northern markets, which loss percentage is greatly increased before reaching the consumer. However, test car shipments of Florida oranges gassed at the shipping point and subsequently regassed at the destination, in accordance with the above-described method, have reached consumers with substantially no decay loss, conclusively demonstrating the effectiveness and commercial worth of the present novel method of applying an inhibitor to citrus fruits. Other tests have shown the same to be true in respect to other fresh perishable foods. Test carload shipments have been followed through to the consumer which show that commercial results of the use of the present novel method of inhibiting destructive organism development in fruits and the like bear out the laboratory tests which have been conducted in great numbers in connection with the present invention.

Laboratory tests conducted over a long period of time with various fresh perishable foods have conclusively demonstrated the effectiveness of the present novel "regassing" method of maintaining fresh perishable food sound and palatable. In one test, a packed box of No. 200 oranges was placed in a closed fifty-five gallon drum for twenty-four hours at warm room temperature along with 35 cc. of the ethylene dichloridetrichloroethane admixture mentioned above, and the drum then opened. A check packed box of No. 200 oranges from the same grove was placed in the room beside the drum. At the end of seven days following opening of the drum, there were no rots in the gassed box, but six in the check ungassed box. Thereupon, the gassed box was re-gassed exactly as in the first instance, and the drum opened following the twenty-four hour period. At the end of one day following the second gassing (ten days from the start of the test), there were still no rots in the gassed fruit and seventeen rots in the check fruit. At the end of seventeen days from the start of the test, there was one rot in the gassed fruit and sixty-four in the check fruit.

In another laboratory test using No. 200 oranges from another grove, employing as nearly as possible the conditions of the first-mentioned test in initial gassing and in regassing, the gassed fruit showed no rots at eight and ten days from the start of the test and one rot at seventeen days, whereas, the check ungassed fruit showed three, eight and thirty-eight rots at eight, ten and seventeen days, respectively.

A third test using boxes of No. 200 oranges from still a third grove and employing the same conditions showed one, three and nine rots for gassed and re-gassed fruit, and nine, twenty, and fifty-seven rots for the check ungassed fruit, each at eight, ten and seventeen days, respectively, from the start of the test.

The organism inhibiting gaseous atmosphere may be attained other than by permitting evaporation. The liquid may be flashed by hot plates, for example, or the inhibitor may be supplied in gaseous form. Further, the above-mentioned inhibitor may be poured in a container rather than on the floor of the transportation unit.

The present novel method of delivering perishable foods in sound condition to the consumer has been successfully demonstrated on many foods including cantaloupes, strawberries, peppers, peaches, and tomatoes employing substantially five quarts of the admixture mentioned above in each instance per carload lot. An admixture of two parts propylene dichloride and one part trichloroethane, both by weight may be used in the present novel organism inhibiting method, particularly for a single application, in amounts comparable to those for the above-mentioned admixture. Trichloroethane may be used alone as an organism inhibiting agent in the present novel method, in which case substantially five quarts are employed as against two to two and a half gallons of the first-mentioned admixture.

As mentioned, the present novel method may be practiced upon refrigerated or iced fresh perishable foods, which may be used with some fresh perishables, such as strawberries, to achieve a fresher appearance than is obtained with an inhibitor atmosphere alone. However, soundness of product obtains under the present organism inhibiting method even where a "wilted" appearance develops, and this "wilted" appearance may be eliminated by refrigeration at the retailer where it does develop.

It is manifest that the present novel method finds wide application in the preservation of perishable foods for predetermined ascertained increments of time, and that it fulfills the objects and advantages sought therefor.

It is to be understood that the foregoing description has been given by way of illustration and example. It is also to be understood that substitution of equivalent steps and rearrangement of steps, which will be readily apparent to one skilled in the art, are contemplated as within the scope of the present invention which is limited only by the claims which follow.

What is claimed is:
1. A method of inhibiting the growth of bacteria, mold, and other destructive organisms on strawberries comprising the steps of subjecting strawberries to an atmosphere containing a member of the group consisting of trichloroethane, trichloroethane and ethylene dichloride, and trichloroethane and propylene dichloride to inhibit the growth of bacteria, mold, and other destructive organisms, and insuring substantially blanketing contact of the gas with the fruit.
2. A method of inhibiting the growth of bacteria, mold, and other destructive organisms on strawberries, comprising the steps of subjecting strawberries to an atmosphere containing ethylene dichloride and trichloroethane gases, and insuring substantially blanketing contact of the gases with the fruit.
3. A method of inhibiting the growth of bacteria, mold, and other destructive organisms on strawberries comprising the steps of subjecting strawberries to an atmosphere containing ethylene dichloride and trichloroethane gases in the ratio of substantially two parts of the former to one part of the latter, both by weight, and insuring substantially blanketing contact of the gases with the fruit.
4. A method of inhibiting the growth of bacteria, mold, and other destructive organisms on strawberries, comprising the steps of placing the strawberries to be treated in a railway car, to the extent of substantially a carload shipment, evaporating substantially five quarts of liquid propylene dichloride and trichloroethane admixture into the car, and permitting the gases to substantially blanket the individual fruit.
5. A method of inhibiting the growth of bacteria, mold, and other destructive organisms on strawberries, comprising the steps of placing the strawberries to be treated in a railway car, to the extent of substantially a carload shipment, evaporating substantially five quarts of liquid trichloroethane into the car, and permitting the gas to substantially blanket the individual fruit.
6. A method of inhibiting the growth of bacteria, mold, and other destructive organisms on strawberries in the interior space of a cargo carrier of the size of substantially a railway car, which comprises the steps of evaporating an amount of liquid ethylene dichloride and trichloroethane admixture into the space sufficient to substantially inhibit organism effected decay for a period of time, and permitting the gases to substantially blanket the individual fruit.

References Cited in the file of this patent

UNITED STATES PATENTS

| | | |
|---|---|---|
| 2,107,697 | Griffith et al. | Feb. 8, 1938 |
| 2,511,987 | Mrak et al. | June 20, 1950 |
| 2,577,421 | Keller | Dec. 4, 1951 |
| 2,755,188 | Keller | July 17, 1956 |